United States Patent [19]

Rosenhouse et al.

[11] Patent Number: 4,575,403
[45] Date of Patent: Mar. 11, 1986

[54] APPARATUS FOR DISTILLING PHOSPHORUS

[75] Inventors: Harvey Rosenhouse, East Windsor; Jeffrey C. Dore, Hamilton Square, both of N.J.

[73] Assignee: FMC Corporation, Philadelphia, Pa.

[21] Appl. No.: 616,377

[22] Filed: Jun. 1, 1984

Related U.S. Application Data

[62] Division of Ser. No. 385,144, Jun. 4, 1982, Pat. No. 4,483,746.

[51] Int. Cl.$^4$ ............................................. B01D 3/14
[52] U.S. Cl. ..................... 202/153; 202/159; 202/161; 202/187; 202/198; 202/205; 203/88; 203/91; 423/322
[58] Field of Search ............... 202/161, 159, 198, 177, 202/176, 205, 187, 179, 158, 153; 203/88, 87, 91, 49, 4; 75/6, 7, 9; 423/299, 322; 23/294 R, 306, 307

[56] References Cited

U.S. PATENT DOCUMENTS

| | | | |
|---|---|---|---|
| 1,504,588 | 8/1924 | Tunison | 202/198 |
| 1,730,892 | 10/1929 | Leslie | 202/198 |
| 2,224,926 | 12/1940 | Potts et al. | 202/177 |
| 2,852,446 | 9/1958 | Bromberg | 203/4 |
| 2,903,401 | 9/1959 | Heere | 202/161 |
| 3,658,655 | 4/1972 | Heere | 202/161 |
| 3,860,491 | 1/1975 | Baird et al. | 202/161 |
| 4,033,617 | 7/1977 | Cocuzza et al. | 202/198 |
| 4,390,398 | 6/1983 | Coker et al. | 202/161 |

FOREIGN PATENT DOCUMENTS 981420 1/1965 United Kingdom .

Primary Examiner—Wilbur Bascomb
Attorney, Agent, or Firm—Frank Ianno; Eugene G. Seems

[57] ABSTRACT

A continuous process for reducing the arsenic content of phosphorus is described in which the impure phosphorus is continually passed through a heat exchanger and heated to vaporize a portion of the phosphorus at a temperature not above 200° C., separating the vaporized phosphorus in a disengaging zone under subatmospheric pressure and introducing it into a fractionating zone under subatmospheric pressure, fractionating the phosphorus from the less volatile arsenic, condensing under subatmospheric pressure low-arsenic phosphorus rising from the fractionating zone, returning a portion of the low-arsenic phosphorus condensate as reflux to the column, removing high-arsenic liquid phosphorus as bottoms from the fractionating zone, and recovering the remaining portion of low-arsenic phosphorus condensate as product.

3 Claims, 1 Drawing Figure

APPARATUS FOR DISTILLING PHOSPHORUS

This application is a division, of application Ser. No. 385,144, filed June 4, 1982, now U.S. Pat. No. 4,483,746.

The present invention relates to process for the purification of elemental phosphorus, and particularly to reducing its arsenic content.

In the present state of the art, elemental phosphorus is produced by reacting phosphate ore with carbon at high temperatures in an electric furnace. In the operation of such furnaces, the phosphate ore is typically agglomerated, calcined and fed into the furnace with coke to supply carbon, and silica to act as a fluxing agent. Graphite electrodes suspended within the furnace are in contact with the furnace feed and form a melt zone at the base of the electrodes where the phosphate ore is reduced to phosphorus.

The resulting phosphorus is vaporized, removed from the furnace, cleaned by electrostatic precipitators and condensed in one or more condensation steps by direct contact with water to form an aqueous slurry of phosphorus. Any heavy metals, such as arsenic, are vapored with the phosphorus and are condensed with the liquid phosphorus product. If the phosphorus ore contains large amounts of a heavy metal, such as arsenic, most of the arsenic finds its way into the phosphorus product. In many instances, the amount of arsenic in the liquid phosphorus product may reach as high as 400 ppm.

In many applications where the phosphorus is used as an intermediary in the production of various phosphorus derivatives, this amount of arsenic is undesirable with the inevitable result that either the phosphorus has to be purified or a low-arsenic ore must be used in producing phosphorus. Since the availability of a low-arsenic shale is not always dependable or accessible to phosphorus plant locations, there is continued interest in developing processes for purifying the phosphorus to reduce its arsenic level.

Separation of arsenic from phosphorus presents some very formidable problems. Initially, the phosphorus is not pure, and contains dirt, calcined ore, fine silica and tars, all or any of which can coat surfaces of treating equipment causing them to foul and to require frequent cleanouts. Also, the phosphorus must be maintained above 44° C. at all times otherwise it freezes and clogs pipes and conduits. Since the phosphorus is pyrophoric, any air or other oxidizing gas that contacts the phosphorus results in highly exothermic combustion of phosphorus and the evolution of phosphorus pentoxide fumes. In order to avoid phosphorus combustion, it is normally stored in a liquid state under water. When vaporized, phosphorus is usually maintained under a blanket of inert gas. For example, when producing phosphorus, it is enveloped in an inert gas such as carbon monoxide during its distillation from the electric furnace prior to being condensed and stored under water. Other known processes for distillation of phosphorus are conducted under steam (at temperatures below 180° C.) or other gases that are inert to phosphorus at the temperature of distillation as reported in British Specification 981,420. Care must also be taken that white phosphorus (which is the major item of commercial importance) does not convert to red phosphorus at temperatures above 200° C.

Prior workers have employed various techniques to effect phosphorus purification. In U.S. Pat. No. 3,053,637, phosphorus is reported to be purified by vaporizing the phosphorus to temperatures of 850° C. to 1000° C. in the presence of a stream of argon, helium, or a mixture thereof, and condensing the vaporized phosphorus. In the absence of employing a stream of helium or argon, a lower purity product is recovered. This procedure, requiring rare gases and extremely high temperatures, obviously would only be useful for laboratory preparations or small pilot operations and not for industrial quantities. The patent examples show typical laboratory scale illustrations of the process.

In U.S. Pat. No. 3,565,707, phosphorus is reported to be treated with sulfuryl chloride, which selectively reacts with arsenic, to form arsenic derivatives that are removed by extraction or distillation with a stream of sulfuryl chloride. This has not been found satisfactory because of high phosphorus losses, waste disposal and corrosion problems.

Others have recovered pure phosphorus by distilling an impure phosphorus mud in the presence of molten lead, as described in U.S. Pat. No. 4,081,333. This is environmentally undesirable because of the exposure to toxic lead and lead vapors.

Another purification technique reported in British Specification 981,420, requires passing an inert gas (under the purification condition employed) through the phosphorus under subatmospheric pressures to effect distillation of the phosphorus and recovery of a low-arsenic phosphorus condensate. This procedure has not been found efficient because the inert gas employed reduces the mass transfer between phosphorus vapor and liquid requiring extremely large equipment to effect the separation. Also, maintenance of subatmospheric pressures in equipment in which a stream of inert gas is being constantly injected requires a large vacuum pump and high costs to maintain the vacuum.

A continuous process for reducing the arsenic content of phosphorus has been found which obviates many of the drawbacks of these prior processes; it comprises:

(A) continually feeding impure molten phosphorus through a heat exchanger, (B) heating the impure phosphorus in said heat exchanger to a temperature sufficient to vaporize a portion of the phosphorus, but not above 200° C., (C) continuously removing the heated phosphorus flowing through said heat exchanger and introducing same into a disengaging zone maintained at subatmospheric pressure, (D) separating phosphorus vapor from phosphorus liquid and any non-volatile impurities in the disengaging zone, (E) continuously passing the separated phosphorus vapor into a fractionating zone maintained at subatmospheric pressure, (F) fractionating phosphorus from the less volatile arsenic in said fractioning zone in the substantial absence of any other non-phosphorus vapor streams, (G) condensing phosphorus vapor rising from the top of said fractionating zone in a condensing zone under subatmospheric pressure to obtain low-arsenic liquid phosphorus, (H) returning a portion of the condensed liquid phosphorus to the fractionating zone as a reflux stream, and contacting it with upflowing phosphorus vapors, (I) removing high-arsenic liquid phosphorus from the bottom of the fractionating zone, and (J) recovering the remaining portion of the condensed low-arsenic liquid phosphorus as product.

In the preferred mode of operation, an inert gas leg is maintained between the vacuum source (employed to maintain the fractionating zone and condensing zone under vacuum) and the condensing zone to substantially isolate the vacuum source from any uncondensed phosphorus vapors that may pass through the condensing zone.

BRIEF DESCRIPTION OF THE DRAWING

In the drawing, there is illustrated a schematic flow sheet for carrying out the present process.

The present invention can best be described with reference to the attached drawing. In the drawing, the phosphorus feed enters through line 2 and is composed of essentially white phosphorus with minor amounts of impurities such as dirt, calcined ore, fine silica and tars. These impurities are retained in the phosphorus when it is produced in the electric furnace and recovered by condensing the evolved phosphorus by direct water sprays. The most practical way of pumping the phosphorus through line 2 and into the rest of the system to be described hereinafter, is to displace the phosphorus by pumping water into a closed storage tank containing the phosphorus and removing the phosphorus from an exit tube extending into the phosphorus layer.

Figure 1:
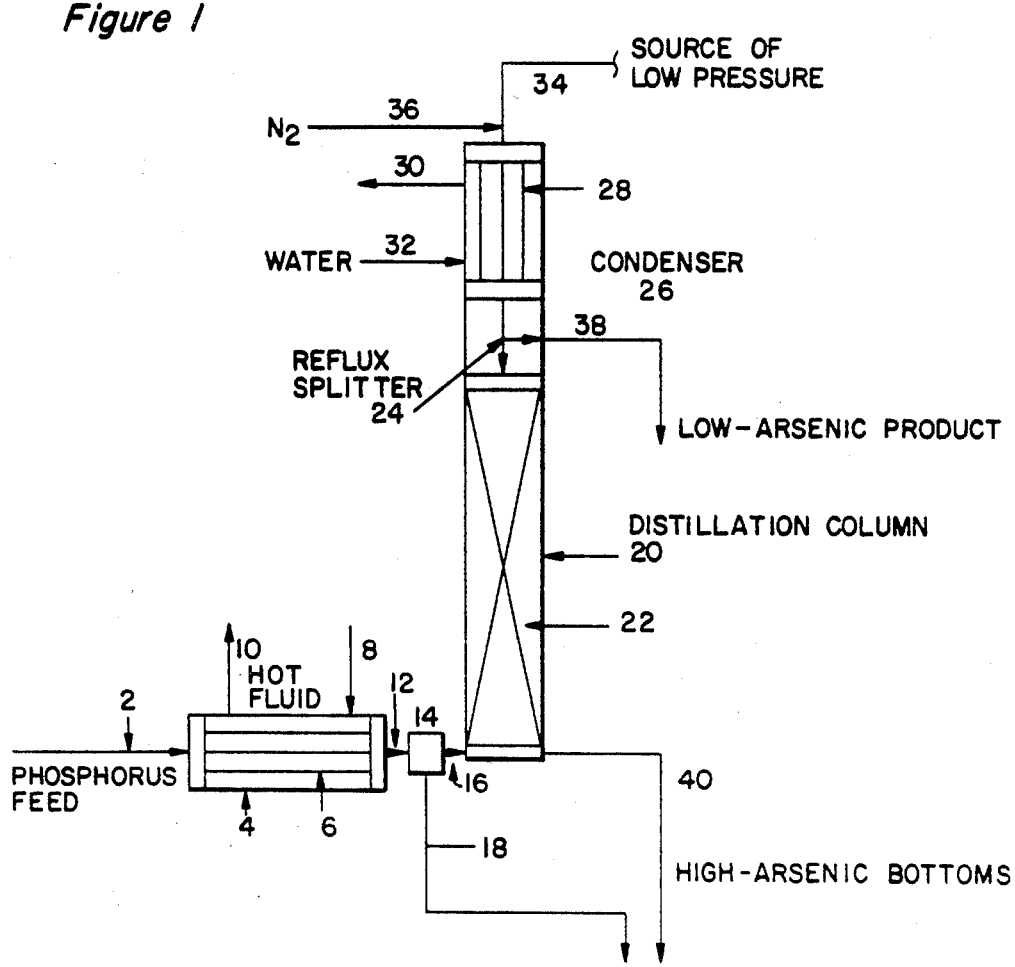

The phosphorus is passed from line 2 into heat exchanger 4 by passing the phosphorus through heater tubes 6 located within the heat exchanger 4. A hot fluid such as oil, steam or the like, are used to heat the phosphorus in tube 6 by passing the fluid through the shell of heat exchanger 4. The hot fluid enters the shell heat exchanger 4 through line 8, gives up its heat to the phosphorus, without directly contacting the phosphorus, and the cooled fluid is removed through line 10.

The phosphorus is heated in heat exchanger 4 to a temperature sufficient to vaporize a portion of phosphorus, but not above 200° C. The precise temperature to which the phosphorus is heated will vary, depending on the amount of phosphorus which is to be vaporized in heat exchanger 4. If desired, some subatmospheric pressure can be maintained in the heat exchanger 4, although the exact amount may vary from the subatmospheric pressure maintained downstream. It is preferred to vaporize from 20% to 80%, and most preferably about 50%, of the phosphorus passing through heat exchanger 4, or at least to supply sufficient heat so that this amount of phosphorus is vaporized downstream from the heat exchanger.

The heated phosphorus passes out of heat exchanger 4 through line 12 into a disengaging chamber 14, maintained under subatmospheric pressure. In the disengaging chamber 14, the heated phosphorus separates into vapor and liquid, the vapor being removed through line 16 while the liquid is removed through line 18. The proportion of phosphorus which is vaporized will increase as the heat input to the phosphorus is increased and/or the pressure in disengaging chamber 14 is decreased. If the subatmospheric pressure in heat exchanger 4 and disengaging chamber 14 are the same, the heated phosphorus will simply separate into its vapor and liquid components, the proportion of each depending on the heat input and the amount of subatmospheric pressure in disengaging chamber 14.

If the heat exchanger 4 is at a higher pressure than disengaging chamber 14, some phosphorus will be converted from liquid to vapor and "flash" off in disengaging chamber 14.

In all events, the vapors formed in disengaging chamber 14, whether by flashing or by simple separation from the liquid phosphorus, are removed through line 16 and enter the base of distillation column 20. Distillation column 20 is filled with a packing 22 designed to give a large surface area within column 22 and provide sufficient surface area to maximize contact between liquid and vapor. The packing may be any substances inert to the phosphorus such as 316 stainless steel, Pall rings, Intalox saddles, Rashing rings, etc. The vaporized phosphorus from line 16 enters the base of distillation column 20 and proceeds up the tortuous path through the packing 22. In its upward movement, it is met by a reflux of condensed phosphorus from condenser 26. As a result of this continuous contact between reflux liquid phosphorus from the top of the distillation column and the vaporized phosphorus entering the base of column 20, the phosphorus is fractionated in column 20 and the less volatile arsenic tends to remain lower down the column while the more volatile phosphorus, diminished in arsenic value, rises upward through the column 20. The phosphorus vapor emanating from packing 22 at the top of the column then contacts condenser 26.

The condenser 26 is a tube and shell condenser containing a number of vertically set tubes 28 into which the phosphorus vapor flows. The condenser 26 is cooled by passing water into the shell of the condenser by through line 32 and removing the cooling water through line 30. The phosphorus vapors pass into the cooled tubes 28, which are vertically aligned, and as the vapor rises in the condenser and touch the cooled inside walls of the tubes, the phosphorus condenses to liquid and drains down the sides of the tube into reflux splitter 24. This device apportions the condensate so that part of the condensate is returned to the top of the distillation column 20 as reflux while the remaining portion is removed through line 38 and recovered as the low-arsenic phosphorus product. The reflux ratio, that is the amount of condensate returned as reflux to the column to the amount of condensate removed as product from the column, may vary as desired, but in general, a reflux ratio of about 0.5 to 5 has been found to be acceptable, with a ratio of about 1 being preferred.

In this configuration of the condenser, the phosphorus vapors enter the condenser tubes 28 and pass upward into the condenser until they condense to liquid phosphorus. The condensate then drains down the inside walls of tubes 28. Since there is phosphorus vapor continually flowing into these tubes, the liquid condensate and the vapor are not impeded from remaining in equilibrium with each other and can be at approximately the same temperature, notwithstanding the latent heat of condensation differential between the vapor and condensate. In the present design of the condenser tubes 28, the condensate has no opportunity of clogging or solidifying in the tubes because the phosphorus vapor is in continuous contact with the liquid condensate and prevents any undue cooling. Further, since the phosphorus liquid which forms on the inside of the vertical tubes 28 remains in liquid form, it easily drains down the tubes and is thus continually withdrawn from the condenser by the force of grovity.

From the top of condenser 26, a line 34 is connected to a source of low pressure such as a vacuum pump, steam jet or the like, to cause a subatmospheric pressure to exist in the condenser 26, distillation column 20 and disengaging chamber 14. Nitrogen is preferably injected into tube 34 through tube 36 to maintain a nitrogen leg in tube 34 between the source of the vacuum and the condenser 26. This effectively prevents any small residual amounts of phosphorus that may escape being condensed in condenser 26 from being drawn into line 34 and into the vacuum source at the end of line 34. The nitrogen leg in line 34 effectively acts as a vapor barrier to minimize the escape of any phosphorus into the line 34 subsequently to the vacuum source. The liquid high-arsenic phosphorus which accumulates at the base of distillation column 20 is removed through line 40 with minimum holdup.

In the present process, no inert gas is employed in carrying out the present separation of phosphorus from arsenic. As a result, once the distillation column and condenser have been evacuated of air and the proper subatmospheric pressure reached by a vacuum means connected to line 34, there is very little additional non-condensable gas that must be removed from the system by the vacuum means. As a result, the nitrogen injected through line 36 forms essentially a stable leg in line 34 and the subatmospheric pressure in the condenser and distillation column are maintained without any large movement of gas through line 34 into the vacuum source. This allows the size of the vacuum source to be sufficiently small to just maintain the desired vacuum in the condenser and distillation column without having to be of a size sufficient to remove large quantities of non-condensables from the system.

One non-condensable gas that finds its way into the system is derived from the unavoidable, residual water dissolved in the phosphorus feed introduced into the system. This water will, of course, vaporize in the distillation column 20 and rise into condenser 26. The coolant entering condenser 26 is maintained at a temperature of about 60° C., which is sufficient to condense the phosphorus into a liquid but not to freeze it into a solid. At this temperature, the resulting water vapor may not condense to a liquid in condenser 26. As a result, some of the vapor could escape into line 34 and be drawn into the vacuum source. Since the solubility of water in phosphorus is very low, on the order of 0.3% or so, the amount of water which could be vaporized in column 20, passed uncondensed through condenser 26, and finally drawn into line 34 to the vacuum source would indeed be very, very small.

It is desired to utilize a vacuum source of limited size since this will act as a safety feature in the present system. More specifically, if there are any leaks in the distillation column 20 or condenser 26, the air leakage into the system will increase the pressure inside the distillation column and condenser 26. This, in turn, will reduce or stop vaporization of phosphorus and thereby effectively stop phosphorus distillation. If a vacuum source of limited capacity is employed which does not have the capacity to evacuate the distillation column 20 and condenser 26 when there is substantial leakage into the system, this lack of vacuum capacity will eventually prevent further phosphorus vapor from forming and being distilled in the system, resulting in automatic shutdown. Of course, if there is no leakage in the distillation column 20 or condenser 26, then the vacuum source has the capacity to maintain the proper vacuum in the system, and as explained previously, little if any non-condensables must be removed from the phosphorus distillation system.

In the above description of the invention, the disengaging chamber 14 has been described as a separate unit following the heat exchanger 4, in which to disengage phosphorus vapor from the heated phosphorus liquid. As an alternate embodiment, it is within the scope of this invention to build this disengaging space at the base of distillation column 20 instead of utilizing a separate unit. In this instance, the disengaging chamber 14 would simply be incorporated within the base of distillation column 20 with sufficient space so that the phosphorus vapor and phosphorus liquid would be able to separate at the base of the distillation column. In this embodiment, only a single liquid line 40 at the base of distillation column 20 would be required to discharge both the liquid phosphorus which results when the phosphorus vapor separates from phosphorus liquid, as well as the liquid which is recovered from the distillation column 20 as the result of the fractionating process.

The following example is given to illustrate the invention and is not deemed to be limiting thereof.

EXAMPLE

A fractionating system as described in the drawing was assembled. The heat exchanger 4 was a horizontal shell-and-tube heat exchanger with continuous phosphorus flow inside the tubes. Heat was provided by circulating a hot oil stream through the heat exchanger. The disengaging chamber 14 was mounted at the heat exchanger 4 outlet to prevent any liquid flowing into the distillation chamber 20.

The distillation column 20 was constructed from 4-inch schedule 10 pipe, 316 stainless steel, containing as packing 22, $\frac{5}{8}$-inch 316 stainless steel Pall rings. The total packed height was 17-feet (5.2 m), divided into an upper 10-foot (3.1 m) long section and a lower 7-foot (2.1 m) long section, each section supported by a wavy perforated plate and each was covered by a notched-weir liquid distributor plate. A wiper-type liquid distributor was located in the middle of each packed section, with a third wiper distributor on top of the lower section, to redirect liquid that might attempt to drain down the inside walls.

A condenser 28 was mounted directly above the distillation column and was a single-pass vertically oriented shell and tube heat exchanger, mounted so that condensate in the tubes would flow downwardly along the inner surface of the tubes and drip into the column. The heat removed during condensation was carried away by circulating water in the condenser shell, out of contact with the phosphorus in the tubes. The water was heated by steam injection to 60° C. before being circulated through the condenser to assure that any phosphorus, which freezes at 44° C., did not solidify in the tubes.

The condensate flowing down the tubes flowed into a reflux splitter 24, which was a timer-controlled solenoid device that alternately directed the entire condensate stream either down into the column or into the product discharge line.

The vacuum source was a two-stage liquid ring vacuum pump sufficient to maintain reduced pressure in the system to 100 mm of Hg (13.3 kPa) or less.

A demonstration run was performed continuously for 180 hours in the above described equipment under the following conditions:

|  | Arsenic Analysis |
| --- | --- |
| Feed rate (line 2) - 96 lbs/hr (44 kg/hr) of yellow phosphorus | 322 ppm |
| Product rate (line 38) - 27 lbs/hr (12 kg/hr) of yellow phosphorus | 61 ppm |
| Bottoms rate (line 40) - 27 lbs/hr (12 kg/hr) of yellow phosphorus | 311 ppm |
| Liquid from disengaging chamber (18) - 42 lbs/hr (19 kg/hr) | 495 ppm |
| Temperature at bottom of column - 200° C. | |
| Vapor pressure at bottom of column - 122 mm of Hg (16.3 kPa) | |
| Temperature at top of column - 185° C. | |
| Vapor pressure at top of column - 80 mm of Hg (10.7 kPa) | |
| Reflux ratio: 1 | |
| Cooling water temperature: 60° C. | |

A nitrogen leg was maintained in line 34 by injecting nitrogen into line 36. There was no $P_2O_5$ plume visible from the vacuum pump vent stack. Three stack samples were analyzed and showed that the total vent rate of phosphorus did not exceed 4 grams/hour. No plugging or build up of residue were found in either the condenser tubes 28 or the heat exchanger tubes 6, nor was there any sign of red phosphorus being produced anywhere.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. An apparatus for distilling phosphorus to reduce its arsenic content comprising:
   (a) a feed conduit for receiving molten phosphorus connected to
   (b) a heat exchanger comprising tubular means through which liquid phosphorus can be passed continuously,
   (c) means for out of contact heating of the phosphorus passing through said tubular means of said heat exchanger,
   (d) an exit conduit from said heat exchanger connected to disengaging means for permitting phosphorus heated in said heat exchanger to be separated into phosphorus vapor and phosphorus liquid, said disengaging means being located in an upstream position from and outside of the fractional distillation zone of any subsequent fractional distillation means,
   (e) fractional distillation means containing a fractional distillation zone located in a downstream position from said disengaging means and connected thereto by conduit means for passing phosphorus vapor into the fractional distillation means, said disengaging means being positioned outside said fractional distillation zone,
   (f) an internal condenser means positioned directly above said fractional distillation means, said condenser means containing vertically disposed second tubular means open at both ends, the bottom ends of said second tubular means being connected to said fractional distillation means whereby phosphorus vapor from said fractionating means can flow into the bottom ends and up into said second tubular means, condense on the inside walls thereof, and drain downwardly therefrom towards said fractional distillation tubular means,
   (g) means for cooling said second tubular means,
   (h) means located below the bottom ends of said second tubular means of said condenser for collecting and splitting the liquid phosphorus condensate from said condenser into a reflux stream, which is directed by the collecting and splitting means into the top of the fractional distillation zone, and a product stream of low arsenic phosphorus, which is directed by the collecting and splitting means into an exit conduit therefor, and
   (i) vacuum means connected to said disengaging means, fractionating means and condensing means to maintain these means under subatmospheric pressure.

2. Apparatus of claim 1 wherein said vacuum means are connected by a conduit to the upper portion of said condenser means thereby placing said condenser under subatmospheric pressure.

3. Apparatus of claim 2 wherein said conduit connecting said vacuum means and said condenser has means to introduce an inert gas into said conduit, thereby maintaining an inert gas leg intermediate said vacuum means and said condenser.

* * * * *